United States Patent
Rudd et al.

(10) Patent No.: US 8,063,985 B2
(45) Date of Patent: Nov. 22, 2011

(54) VIDEO TEST TOOLS

(75) Inventors: Michael J. Rudd, Concord, MA (US);
Donald E. Nelsen, Winchester, MA (US)

(73) Assignee: THX, Ltd., San Rafael, CA (US)

( * ) Notice: Subject to any disclaimer, the term of this patent is extended or adjusted under 35 U.S.C. 154(b) by 1110 days.

(21) Appl. No.: 11/899,949

(22) Filed: Sep. 7, 2007

(65) Prior Publication Data

US 2008/0062264 A1  Mar. 13, 2008

Related U.S. Application Data

(60) Provisional application No. 60/843,465, filed on Sep. 8, 2006.

(51) Int. Cl.
*H04N 7/01* (2006.01)
*H04N 11/20* (2006.01)
*H04N 7/00* (2011.01)
*H04N 11/00* (2006.01)
*H04N 5/00* (2011.01)
*G06K 9/40* (2006.01)

(52) U.S. Cl. ........ 348/451; 348/452; 348/181; 348/497; 348/624; 382/269

(58) Field of Classification Search .......... 348/448–452, 348/497, 607, 624, 181; 382/266, 269
See application file for complete search history.

(56) References Cited

U.S. PATENT DOCUMENTS

2008/0089608 A1 * 4/2008 Phillips ......................... 382/283
* cited by examiner

*Primary Examiner* — Andrew Koenig
*Assistant Examiner* — Jason J Chung
(74) *Attorney, Agent, or Firm* — Paul J. Backofen, Esq.; Crockett & Crockett, PC

(57) ABSTRACT

A video test tool for diagnosing video processing for interlacing is disclosed along with a video test tool for quantifying "jaggies" in a video display.

4 Claims, 1 Drawing Sheet

VIDEO TEST TOOLS

RELATED APPLICATIONS

This application claims priority to copending U.S. Provisional patent application 60/843,465 filed Sep. 8, 2006.

FIELD OF THE INVENTIONS

The inventions described below relate to the field of test and diagnostic tools, and more specifically to test and diagnostic tools for video displays and processors.

BACKGROUND OF THE INVENTIONS

Video signals are transmitted as a series of horizontal lines that are combined to give a two-dimensional picture. There are two types of video signals employed today, progressive and interlaced. Progressive video transmits the lines sequentially. Interlaced video is transmitted as two fields; the first field comprises all of the odd lines and the second field comprises all of the even lines. The two fields of odd and even lines have to be combined into a single frame and this is called de-interlacing. If both fields were acquired at the same time, then the two fields cam be simply combined. However if the two fields are acquired at slightly different times and part of the image is moving, then there will be an artifact called combing or feathering. This is a result of the alternating lines being offset horizontal relative to each other. This artifact needs to be removed during the de-interlacing process. There are numerous algorithms for doing this.

The most widely used algorithms are:
Weaving, which simply combines the lines of the two fields;
bobbing, which doubles the lines of each field so as to create a complete frame;
motion, adaptive switch from weaving to bobbing in areas where motion is detected;
motion interpolation on a pixel-by-pixel basis between two successive odd or even fields to create the missing motion.

What is needed is a diagnostic tool to diagnose the de-interlacing algorithm being used in a particular display or video processor.

Modern pixilated displays and to some extent CRT displays may demonstrate an artifact know as "jaggies." Jaggies may arise when a diagonal line is shown on a display with discrete elements, such as pixels. The line then comprises a series of steps, instead of a smooth line. Various signal processing techniques may improve the appearance of the line, but these techniques become difficult as the line approaches the horizontal. These algorithms are effective on video that is changing and moving by interpolating from one frame to the next. Thus a simple static test pattern to evaluate the existence and extent of "jaggies" will not be appropriate.

What is needed is a test pattern providing finer resolution than existing test patterns and enabling an observer to evaluate and quantify the success of the signal processing at removing the "jaggies" and rendering a smooth line.

SUMMARY

A video test tool for diagnosing video processing for interlacing is disclosed along with a video test tool for quantifying "jaggies" in a video display.

A method of determining a video processing algorithm being used to process video images includes the steps of forming two or more diagnostic sections and then forming a background circle in each diagnostic section, the background circle formed of interlaced lines from a first field and a second field, the lines of the first field having a first color and the lines of the second field having a second color which is different from the first color, and the interlacing of the lines of the first field and the lines of the second field forming a background circle with a color derived from the first color and the second color, and forming a foreground circle having a neutral color in each background circle, and moving each foreground circle within it's respective background circle, each foreground circle moving at a different rate, the motion of the foreground circles creating visual artifacts, and interpreting the visual artifacts to determine the video processing algorithm used to process video images.

DETAILED DESCRIPTION OF THE INVENTIONS

Figure 1:
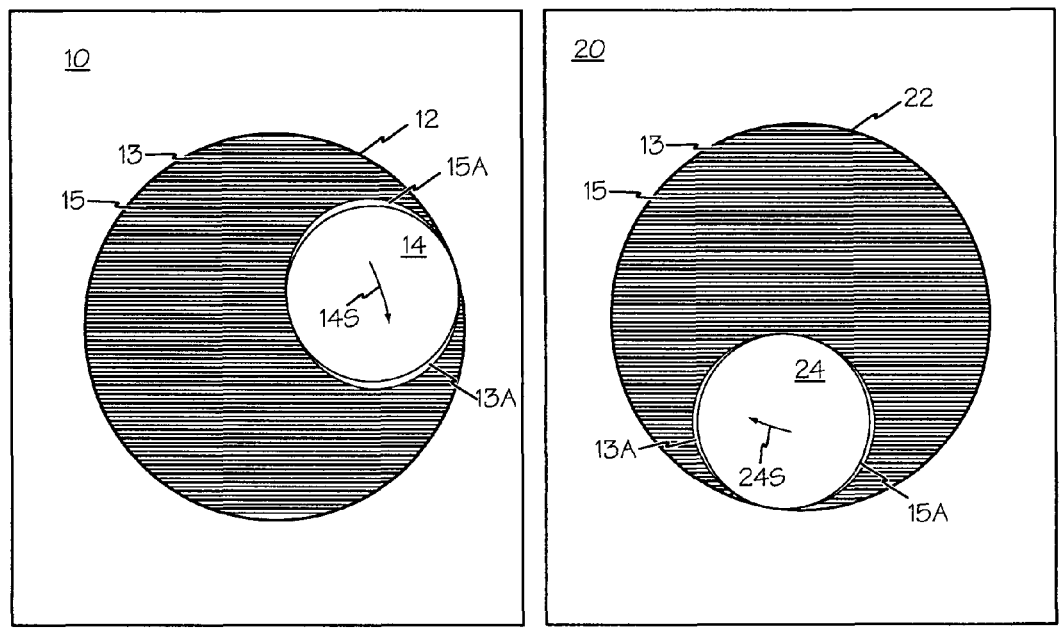
FIG. 1 is a sample frame of an interlacing diagnostic test pattern.

The basic test pattern of FIG. 1 includes two or more sections such as sections 10 and 20, each section including a background circle 12 and 22 and a foreground circle 14 and 24 respectively. Each background circle such as circles 12 and 22 are composed of alternating lines of suitable colors. For example, even number lines 13 may be red and odd number lines 15 may be green. Each foreground circle such as circles 14 and 24 are any suitable color such as grey. The foreground circles are animated to create motion of the foreground circles within their respective background circle. In one configuration, each of the two or more foreground circles orbit within their respective background circles at different rates such as rates 14S and 24S.

The alternating lines of the background circles are displaced or offset in time. Each field, the even number lines or the odd number lines, will reflect the position of the foreground circles at the time the field is created. Thus the even line image may be slightly displaced relative to the odd line image.

In practice, if the de-interlacer is only performing simple weaving, the color of even lines 13 and odd lines 15 will be visible in background circles 12 and 22 and there will be combing at the leading and trailing edges of the foreground circle producing crescents such as crescent 13A and crescent 15A. If the de-interlacer is only performing simple bobbing, then even lines 13 and odd lines 15 will not be resolved and the background such as background circles 12 and 22 will appear as a different flickering color such as for example, yellow. If the de-interlacer is switching from weave to bob when motion is detected, then the colors of the odd and even lines will be visible in the background circle, and there will be a crescent having a different color, such as for example yellow, at the leading and trailing edge of the foreground circle. If the de-interlacer is performing motion interpolation in a pixel-by-pixel basis, then the image will be free from artifacts. Other algorithms will produce different artifacts, such as a fading wake behind the trailing edge of the foreground circle.

Figure 2:
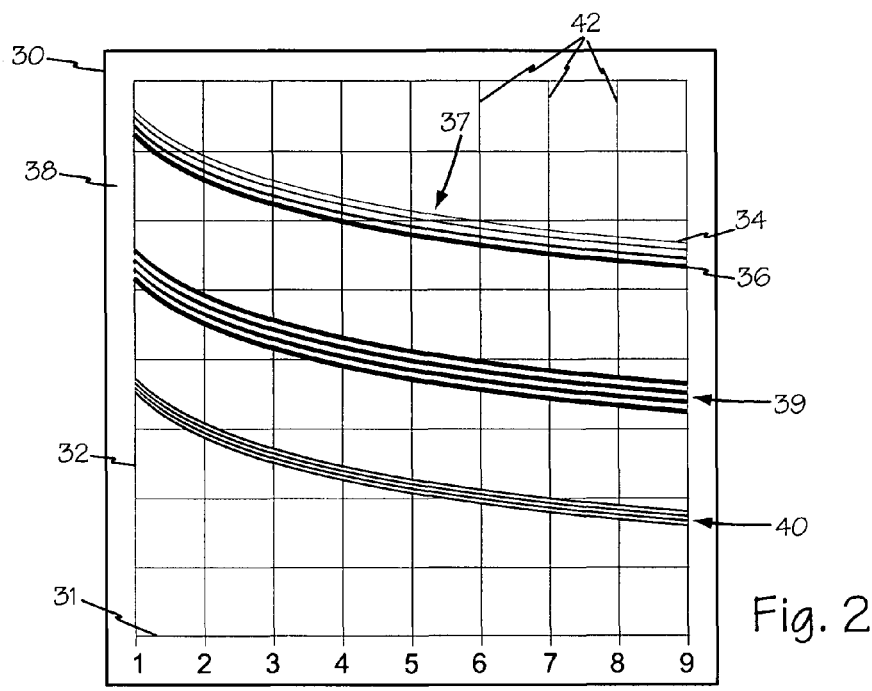
FIG. 2 is a sample frame of a "jaggie" diagnostic test pattern.

Referring now to FIG. 2, a suitable test pattern 30 to detect and quantify "jaggies" may comprise a curve such as curve 34, between x axis 31 and y axis 32. The slope of curve 34 decreases continuously along the x-axis. When x=K the slope of the curve is −1, when x=2K the slope is −½, when x=3K the slope is −⅓ and so on. Thus, curve 34 is a logarithmic curve. This curve may be a line with significant thickness, like a "rope," or a dividing edge between areas of suitably contrasting colors such as black and white. To create motion, which is needed to stress the signal processing, the curve is oscillated back and forth in any suitable direction or in a circular motion. Jaggies will be seen on the curve where it is shallow (high values of x) but not where it is steep (small values of x).

To use test pattern 30, an observer notes the location on the curve along the x-axis where the Jaggies first become visible and records this value. For example, for curve 34, point 37 has an x-value of about 5.3.

By coloring all the pixels that are between y=f(x)+5 and y=f(x) at each x, it is possible to generate a line 5 pixels wide such as line 36. Line 36 may be any suitable color such as, for example, white. To provide contrast, background 38 may be colored to provide optimal contrast such as black. Line 36 will have a slope of −1 at x=1, −2 at x=2, −3 at x=3, etc.

By adding in a function N x sin (2pi*m/(M−1)) where m goes from 1 to M, line 34 may be made to move up and down sinusoidally by +/−N pixels where m advances by one in each successive frame, as in:

$$y=f(x)+N*\sin(2*pi*m/(M-1))$$

where m goes from 1 to M in successive frames.

In images formed by interlacing, if the difference is selected to be an odd number, like 3 or 5, then the roping might look worse than if the difference is selected to be an even number. It may be possible to select both odd and even differences, in the same structure, to determine which looks better.

Logarithmic and exponential functions have nice behavior that make it relatively simple to express in an arbitrary sub-frame in a 1920×1080 frame.

Other suitable variations for a suitable jaggie pattern may be a collection of lines vertically arranged with 3 pixel white/3 pixel black, alternating. The number of black spaces may also be different from the white line spaces, e.g., 2/3/2/3/2/3 w/b/w/b/w/b. Any other suitable combinations of colors may also be selected such as for example alternating between red and white, as in the American flag, so as to implement color.

The lines can be arranged in a single vertical stack containing groupings of b/w/b . . . and or r/w . . . such as stack 39, and or single lines and stack 40. The entire stack will move up and down (or rotationally) by the sinusoidal term(s) that is (are) added to the equations that describe each stack. The large comb of these lines operates as a resolution test useful also for both progressive and interlaced testing.

The entire stack may have a common set of vertical fiduciary lines such as lines 42 in, for example, a contrasting red or cyan color, each indicating the value of the derivative common to all the curves in the stack.

Besides being up and down in a sinusoidal fashion, the motion may be in a triangular wave fashion, it also be in a vertical continuous-scroll, with the structures always going upwards, going off the top and coming up from the bottom again (or the other way).

An example of the code for producing a 512×512 progressive sub-image consisting of a stack of 4 white lines on a black background is illustrated below.

```
aa=zeros(512,512,3); %creates 512 x 512 black matrix, also an
    %image, with three planes for red, green and blue.
for ix=1:512
    for jy=1:512
        %Four white lines created shifts: 3/3/3/3/3/3
        %pixel at jx and jy is tested for each of the four
        %'lines'
        if (jy <16*log( (ix)/16) +256 +18 & ...
            jy >16*log( (ix)/16) +256 +15) | ...
            ...
            (jy <16*log( (ix)/16) +256 +12 & ...
            jy >16*log( (ix)/16) +256 +9 ) |...
            ...
            (jy <16*log( (ix)/16) +256 +6 & ...
            jy >16*log( (ix)/16) +256 +3 ) | ...
            ...
            (jy <16*log( (ix)/16) +256 +0 & ...
            jy >16*log( (ix)/16) +256 −3)
            aa(jy,ix,1)=1;    %writes to red for that pixel
            aa(jy,ix,2)=1;    %writes to green for that pixel
            aa(jy,ix,3)=1;    %writes to blue for that pixel
        end
    end
end
aa2=(219*aa +16);   %converts to 601 black/white levels
aa3=round(aa2)/255;
imwrite(aa3,'out.tif','tiff');    %writes out to the tiff
    %file, attached
```

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A method of determining a video processing algorithm being used to process video images comprising the steps:
   forming two or more diagnostic sections;
   forming a background circle in each diagnostic section, the background circle formed of interlaced lines from a first field and a second field, the lines of the first field having a first color and the lines of the second field having a second color which is different from the first color, and the interlacing of the lines of the first field and the lines of the second field forming a background circle with a color derived from the first color and the second color;
   forming a foreground circle having a neutral color in each background circle;
   moving each foreground circle within it's respective background circle, each foreground circle moving at a different rate, the motion of the foreground circles creating visual artifacts; and
   interpreting the visual artifacts to determine the video processing algorithm used to process video images.

2. The method of claim 1 wherein the motion of each foreground circle is circular within it's respective background circle.

3. The method of claim 1 wherein the motion of each foreground circle is random within it's respective background circle.

4. The method of claim 1 wherein the first color is red and the second color is green.

* * * * *